(12) United States Patent
Akhter

(10) Patent No.: US 10,313,470 B2
(45) Date of Patent: Jun. 4, 2019

(54) HIERARCHICAL CACHING AND ANALYTICS

(71) Applicant: Integrated Device Technology, Inc., San Jose, CA (US)

(72) Inventor: Mohammad S. Akhter, Ottawa (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 232 days.

(21) Appl. No.: 15/257,026

(22) Filed: Sep. 6, 2016

(65) Prior Publication Data

US 2018/0069941 A1    Mar. 8, 2018

(51) Int. Cl.
| | | |
|---|---|---|
| *H04L 29/08* | (2006.01) | |
| *H04L 12/24* | (2006.01) | |
| *H04L 12/947* | (2013.01) | |
| *H04W 4/46* | (2018.01) | |
| *H04W 4/44* | (2018.01) | |

(52) U.S. Cl.
CPC ........ *H04L 67/2842* (2013.01); *H04L 41/147* (2013.01); *H04L 49/25* (2013.01); *H04L 67/12* (2013.01); *H04W 4/44* (2018.02); *H04W 4/46* (2018.02)

(58) Field of Classification Search
CPC ......... H04L 41/14; H04L 49/25; H04L 67/12; H04L 67/2842
See application file for complete search history.

(56) References Cited

U.S. PATENT DOCUMENTS

| | | | | |
|---|---|---|---|---|
| 7,739,460 | B1 * | 6/2010 | Carr ..................... | G06F 12/0804 |
| | | | | 711/105 |
| 8,848,608 | B1 * | 9/2014 | Addepalli ............. | H04W 4/046 |
| | | | | 370/328 |
| 8,965,590 | B2 * | 2/2015 | Boardman .......... | H02J 13/0079 |
| | | | | 700/289 |
| 9,723,041 | B2 * | 8/2017 | Dong ...................... | H04L 67/12 |
| 2014/0325161 | A1 * | 10/2014 | Voigt .................. | G06F 11/3409 |
| | | | | 711/136 |
| 2017/0006135 | A1 * | 1/2017 | Siebel ..................... | H04L 67/02 |

* cited by examiner

*Primary Examiner* — Joe Chacko
(74) *Attorney, Agent, or Firm* — Christopher P. Maiorana, PC

(57) ABSTRACT

A system includes at least one end-node, at least one edge node, and an edge cloud video headend. The at least one end node generally implements a first stage of a multi-stage hierarchical analytics and caching technique. The at least one edge node generally implements a second stage of the multi-stage hierarchical analytics and caching technique. The edge cloud video headend generally implements a third stage of the multi-stage hierarchical analytics and caching technique.

18 Claims, 4 Drawing Sheets

HIERARCHICAL CACHING AND ANALYTICS

FIELD OF THE INVENTION

The invention relates to computer networks and machine communication generally and, more particularly, to a method and/or apparatus for implementing hierarchical caching and analytics.

BACKGROUND

Driven by a desire to improve management of big data, data processing power and data center content is being moved to the edge of a network instead of being held in a cloud or at a central data warehouse. This move to edge computing is advantageous, for example, in Industrial Internet of Things (IIoT) applications such as power production, smart traffic lights and manufacturing. Edge devices capture streaming data that can be used, for example, to prevent a part from failing, reroute traffic, optimize production and prevent product defects. With ever increasing unstructured data (e.g., video, sensor, etc.), existing data center based processing solutions cannot perform real time analytics and respond back to users due to high latency and significant bandwidth associated with large data sets.

Conventional networks, which feed data from devices for transactions to a central storage hub (the old data warehouse model), cannot keep up with the data volume and velocity created by Internet of Things (IoT) devices. The data warehouse model also cannot meet the low latency response times that users demand. Sending data to the cloud for analysis also poses a risk of data bottlenecks as well as security concerns. New business models need data analytics in a minute or less; in some cases in less than a second. The problem with data congestion will only get worse as IoT applications and IoT devices continue to proliferate. Security cameras, phones, machine sensors, thermostats, cars and televisions are just a few of the items in daily use that create data that can be mined and analyzed. Add the data created at retail stores, manufacturing plants, financial institutions, oil and gas drilling platforms, pipelines, and processing plants to the above data, and it is not hard to foresee a deluge of streaming and IoT sensor data can and will very quickly overwhelm existing conventional data analytics tools.

It would be desirable to implement hierarchical caching and analytics.

SUMMARY

The invention concerns a system including at least one end-node, at least one edge node, and an edge cloud video headend. The at least one end node generally implements a first stage of a multi-stage hierarchical analytics and caching technique. The at least one edge node generally implements a second stage of the multi-stage hierarchical analytics and caching technique. The edge cloud video headend generally implements a third stage of the multi-stage hierarchical analytics and caching technique.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
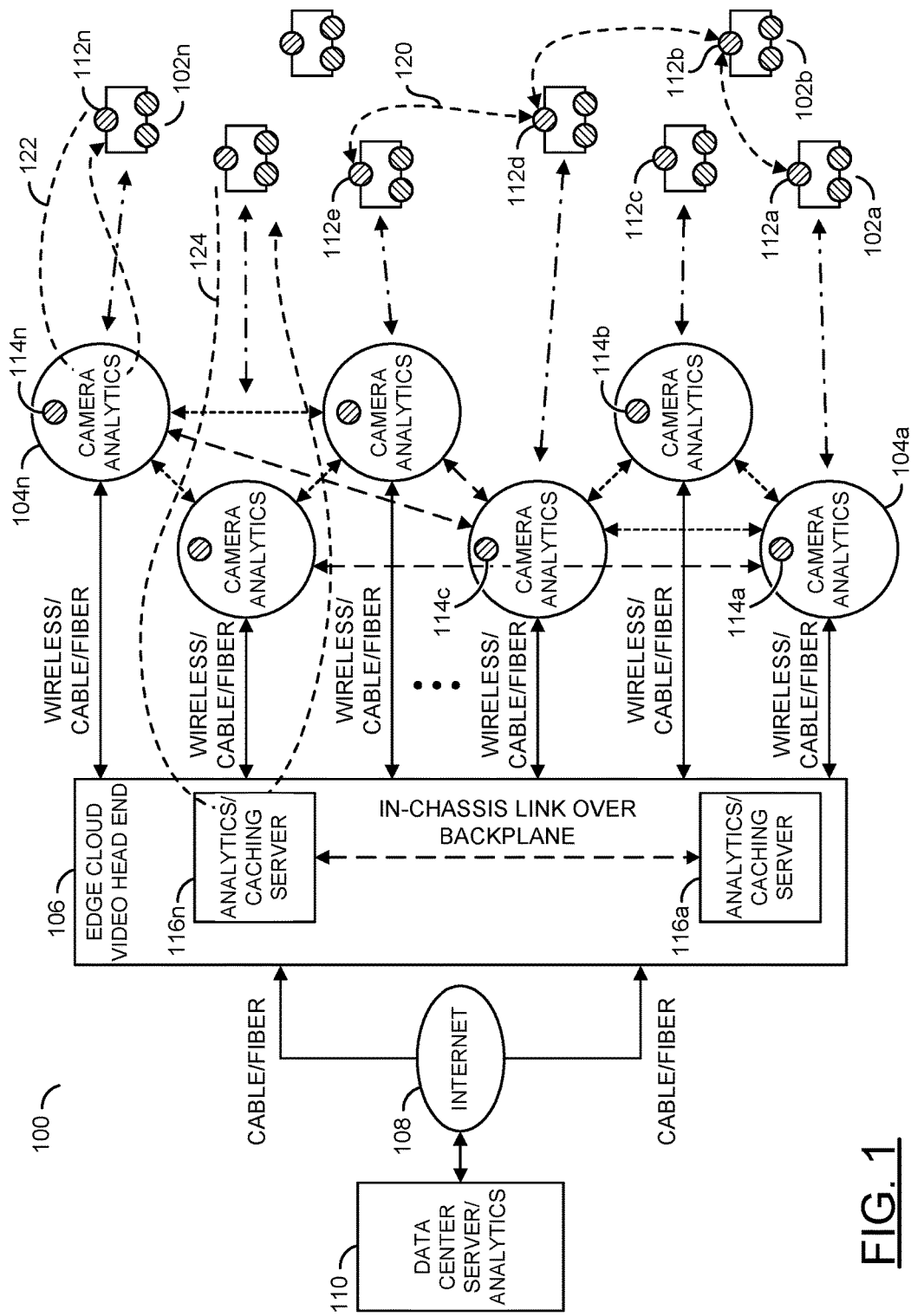
FIG. 1 is a diagram illustrating a system in accordance with an example embodiment of the invention.

Embodiments of the present invention include providing hierarchical caching and analytics that may (i) provide real-time decision making, (ii) enables low latency communication between end nodes, edge nodes and an edge cloud video headend, (iii) utilize flexible computing with integrated wireless and photonics links, (iv) handle big unstructured data, (v) support tactile internet in enterprise and wireless networks, (vi) support internet of things (IoT) applications and devices, (vii) be implement with multiple stages, and/or (viii) be implemented as one or more integrated circuits.

In various embodiments, a multi-stage hierarchical caching and analytics architecture may be implemented comprising an edge cloud video headend, one or more edge nodes (e.g., camera nodes, sensor nodes, etc.), and one or more end-nodes (e.g., mobile devices, vehicles, etc.). In various embodiments, a system architecture includes analytics and caching modules/servers implemented in each of the video headend, the edge nodes (e.g., camera nodes, sensor nodes, etc.), and the end-nodes (e.g., mobile devices, vehicles, etc.). The hierarchical caching and analytics modules/servers in each of the edge cloud video headend, the edge nodes and the end nodes may utilizing flexible computation to configure the architecture to match application demands. In various embodiments, each analytics and caching module/server may include, but is not limited to the following functions/features: a flexible computing engine configured to implement low latency remote memory and storage access acceleration and predictive traffic shaping; a flexible computing engine configured to implement predictive analytics and caching of video and image data based on pre-defined and learned metrics based on the use case; a time and node metadata synchronization engine; a caching and storage function directly attached to a low latency switching fabric through one or more of a wireless link and an integrated photonics link; a wireless and integrated photonics module inside the low latency switching fabric configured to communicate with the end nodes as well as the video headend; and a cluster in the video headend that includes a low latency fabric for inter-node communication and the analytics and caching module(s).

A system in accordance with an example embodiment of the invention generally provides a novel method for real-time decision making based on analytics and caching utilizing flexible computing with integrated wireless and photonics links. The system can be utilized to handle big unstructured data and support tactile internet in enterprise and wireless network applications. In an example, based on hierarchical analytics and caching of data along with synchronized timing, the system may allow sharing of future event information to upcoming vehicles (e.g., multicast information related to black ice, road hazard(s), etc.) through video and data analytics in real time. In the above example, the edge analytics may be utilized to recognize the black ice or road hazard(s) based on real-time streaming video or roadside sensors along with historical images and videos pulled from core servers.

Referring to FIG. 1, a block diagram is shown illustrating a system 100 in accordance with an example embodiment of the invention. In various embodiments, the system 100 implements multi-stage hierarchical analytics and caching techniques in accordance with an embodiment of the invention. The multi-stage hierarchical analytics and caching techniques are generally based on a flexible computation architecture with wireless and photonics links to reduce round-trip latency and support real-time decision making. A first stage of the multi-stage hierarchical analytics and caching techniques may be performed at one or more end-nodes (e.g., mobile devices, vehicles, etc.) 102a-102n. A second stage of the multi-stage hierarchical analytics and caching techniques may be performed at edge nodes or devices (e.g., camera nodes, sensor nodes, etc.) 104a-104n. A third stage of the multi-stage hierarchical analytics and caching techniques may be performed at an edge cloud video-headend 106.

In various embodiments, in addition to end nodes 102a-102n, edge nodes 104a-104n, and the edge cloud video-headend 106, the system 100 may further comprise a block 108 and a block 110. The block 108 may represent a network connection between the block 106 and the block 110. The network connection 108 may be implemented using one or more technologies including, but not limited to local area network (LAN), wide area network (WAN), cloud radio access network (C-RAN), Internet, etc. In one example, the block 108 may implement (support) cable and/or fiber interconnections with the block 106 and the block 110. The block 110 may implement a data server, data center, server farm, and/or data warehouse, and associated analytics.

Each of the end nodes (or units) 102a-102n may comprise a respective hierarchical caching and analytics module/server 112a-112n. Each of the edge nodes (or units) 104a-104n may comprise a respective hierarchical caching and analytics module/server 114a-114n. The edge cloud video-headend 106 may comprise a number of hierarchical caching and analytics modules/servers 116a-116n. The end nodes 102a-102n may be configured to utilize the hierarchical caching and analytics modules/servers 112a-112n to communicate with one another (e.g., path 120), with the hierarchical caching and analytics modules/servers 114a-114n of the edge nodes 104a-104n (e.g., path 122) and/or with the hierarchical caching and analytics modules/servers 116a-116n of the video-headend 106 (e.g., path 124). The interconnections between the end nodes 102a-102n and the blocks 104a-104n and 106 are generally implemented in a wireless protocol. The edge nodes 104a-104n may be configured to utilize the hierarchical caching and analytics modules/servers 114a-114n to communicate with one another and with the edge cloud video-headend 106. The edge nodes 104a-104n generally communicate with one another using one or more wireless protocols. The edge nodes 104a-104n are generally further configured to communicate with the edge cloud vide-headend 106 via one or more of wireless, cable (or copper) and fiber (or optical) interconnections.

The edge cloud video-headend 106 generally comprises a plurality of analytics and/or caching servers 116a-116n. The analytics and/or caching servers 116a-116n may be implemented in the form of blades or other server circuits. In various embodiments, the analytics and/or caching servers 116a-116n may be interconnected using in-chassis links (e.g., over a backplane structure). In various embodiments, the in-chassis backplane links may be implemented using wired links, wireless links, optical links, or any combination of wired, wireless and/or optical links. The block 106 generally connects to the block 110 via the network connection (e.g., the Internet, etc.) 108.

The system 100 may be hierarchically configured in that some portion of the processing may be performed in the edge nodes 104a-104n and some portion of the processing may be performed in the edge cloud video-headend 106. Each of the edge nodes 104a-104n communicate with one another via the modules 114a-114n allowing the edge nodes 104a-104n to coordinate some of the analytics. In an example, some or all of the edge nodes 104a-104n may be configured to interact as a distributed processing cluster. In an example, the edge nodes 104a-104n may exchange information to process edge data from the end nodes 102a-102n. For example, if a vehicle implementing one of the end nodes 102a-102n is one kilometer ahead of another vehicle implementing another one of the end nodes 102a-102n and a particular edge node 104a-104n communicating with the first vehicle determines there is information that would be useful to the second vehicle, the particular edge node 104a-104n associated with the first vehicle can communicate the information from the front vehicle to an edge node 104a-104n associated with the second vehicle.

The edge nodes 104a-104n are generally connected by wireless links because the edge nodes 104a-104n are generally located at the edge of the network making wired connections difficult and/or non-trivial. However, cable and/or optical connections between the edge nodes 104a-104n may be implemented through the cable/optical connections of the modules 114a-114n to the edge cloud video headend 106. The end nodes 102a-102n may communicate through wireless links directly with other end nodes 102a-102n without first sending the information to the edge nodes 104a-104n. For example, in a case where it does not make sense to send information (e.g., particular sensor data) received or processed in a vehicle to the edge nodes 104a-104n, the vehicle may send the sensor information received or processed by the vehicle to one or more other vehicles (e.g., by a unicast or multicast). In an example, by processing some of the data at the edge of the network and enabling vehicles to communicate directly, a round trip time may be reduced for analytics performed within the vehicle.

Figure 2:
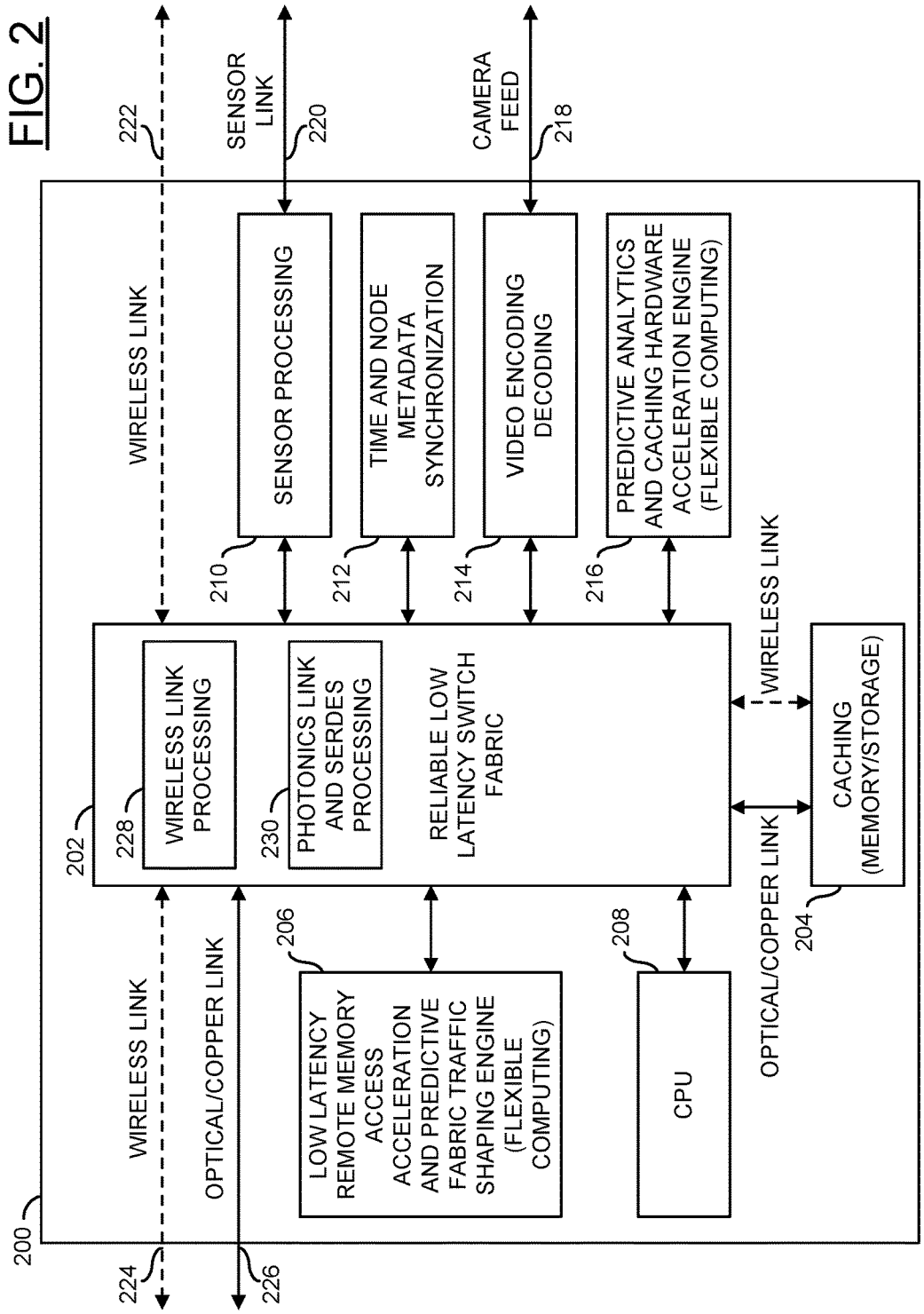
FIG. 2 is a diagram illustrating an example implementation of an embedded flexible computation architecture.

Referring to FIG. 2, a diagram is shown illustrating an example of a caching analytics module 200 in accordance with an example embodiment of the invention. Instances of the module 200 may be embedded in each of the end nodes 102a-102n, the edge nodes 104a-104n and the edge cloud video-headend 106 (e.g., the blocks 112a-112n, 114a-114n, and 116a-116n shown in FIG. 1). In various embodiments, the caching analytics module 200 may comprise a block (or circuit) 202, a block (or circuit) 204, a block (or circuit) 206, a block (or circuit) 208, a block (or circuit) 210, a block (or circuit) 212, a block (or circuit) 214 and a block (or circuit) 216.

The block 202 may implement a reliable low latency switch fabric. In one example, the fabric 202 may be implemented using a low latency switch fabric (e.g., RAPIDIO switch fabric available from Integrated Device Technology, Inc. of San Jose, Calif.). The block 204 may implement a caching functionality for memory and storage. The block 206 may implement a low latency remote memory access acceleration and predictive fabric traffic shaping engine (e.g., utilizing a flexible computing engine). The block 208 may be implemented as an embedded processor circuit (e.g., a central processing unit, microcontroller, microprocessor, etc.). The block 208 may be configured to manage operation of the module 200. The block 210 may implement one or more sensor processing techniques. The block 212 may implement time and node metadata synchronization. The block 214 may implement video encoding and decoding operations. The block 216 may implement a predictive analytics and caching hardware acceleration engine (e.g., utilizing a flexible computing engine).

In various embodiments the block 200 may be connected to the external environment via a camera feed 218, a sensor link 220, wireless links 222 and 224, and/or an optical/copper link 226. The wireless links 222 and 224, and/or an optical/copper link 226 may be connected directly to the block 202. The block 202 may be coupled to the block 204 via both an optical/copper link and a wireless link. The blocks 202 and 204 maybe configured to utilize the bandwidth of both links to minimize latency of memory/storage accesses. The block 202 generally includes a wireless link processing module 228 for managing communications using the wireless links 222 and 224, and an integrated photonics link and serdes processing module 230 for managing the optical/copper link 226 and serializing-deserializing (SERDES) processing. The wireless link processing module 228 and the integrated photonics link and serdes processing module 230 may also be configured to manage the wireless and optical/copper links to the block 204.

The block 206 generally connects via a number of connections, for example, a bus to the block 202. The block 208 is generally connected to the block 202 via one or more busses (e.g., data, address, control, etc.). The block 210 generally facilitates the sensor links 220 from an external environment. The block 212 generally connects through the fabric 202 to the other blocks of the circuit 200. The block 214 generally connects with camera feeds 218 from the external environment and generally connects through the fabric 202 to the other blocks of the circuit 200.

When the block 200 is used to implement the modules 114a-114n in the edge nodes 104a-104n, the wireless links 222 and 224 may be used to connect to the end node modules 112a-112n and other edge node modules 114a-114n. The optical link 226 may be used to connect to the edge cloud video-headend modules 116a-116n. When the block 200 is implemented as one of the modules 116a-116n in the edge cloud video-headend module 106, the wireless links 222 and 224 and the optical link 226 may be used to connect to other devices. For example, the optical link 226 may be used to connect to one or more of (i) the edge node modules 114a-114n, (ii) an optical backplane connecting the modules 116a-116n, and/or (iii) the network 108. The wireless links 222 and 224 may also be used to connect to one or more of (i) the edge node modules 114a-114n, (ii) a wireless backplane connection between the modules 116a-116n, and/or (iii) the network 108.

The block 200 generally provides, but is not limited to the following functions/features: a flexible computation capability configured to implement low latency remote memory and storage access acceleration and predictive traffic shaping (e.g., block 206); a flexible computation capability configured to implement predictive analytics and caching of video and image data based on pre-defined and learned metrics based on particular application (e.g., block 216); a time and node metadata synchronization engine (e.g., block 212); a caching and storage function directly attached to a low latency switching fabric through one or more of a wireless link and an integrated photonics link (e.g., block 204); and wireless link processing and integrated photonics modules inside the switching fabric (e.g., blocks 228 and 230) configured to communicate with the edge nodes 104a-104n as well as the video headend 106. In some embodiments, a cluster of blocks 200 may be instantiated in the video headend 106 including a low latency fabric for inter-node communication between the analytics and caching modules.

The wireless and optical link capacities may be combined or shared to accomplish data transfers. For example, in an embodiment where the wireless link capacity is 10 GB and the optical link capacity is 40 GB, the wireless link processing module 228 and the optical link processing module 230 may be configured to work together to distribute a 50 GB transfer across the two links. In another example, the optical processing module 230 may split the capacity of the optical link between transfers using different data protocols. For example, the optical processing module 230 may be enabled to use different protocols on different wavelengths of the optical link.

Figure 3:
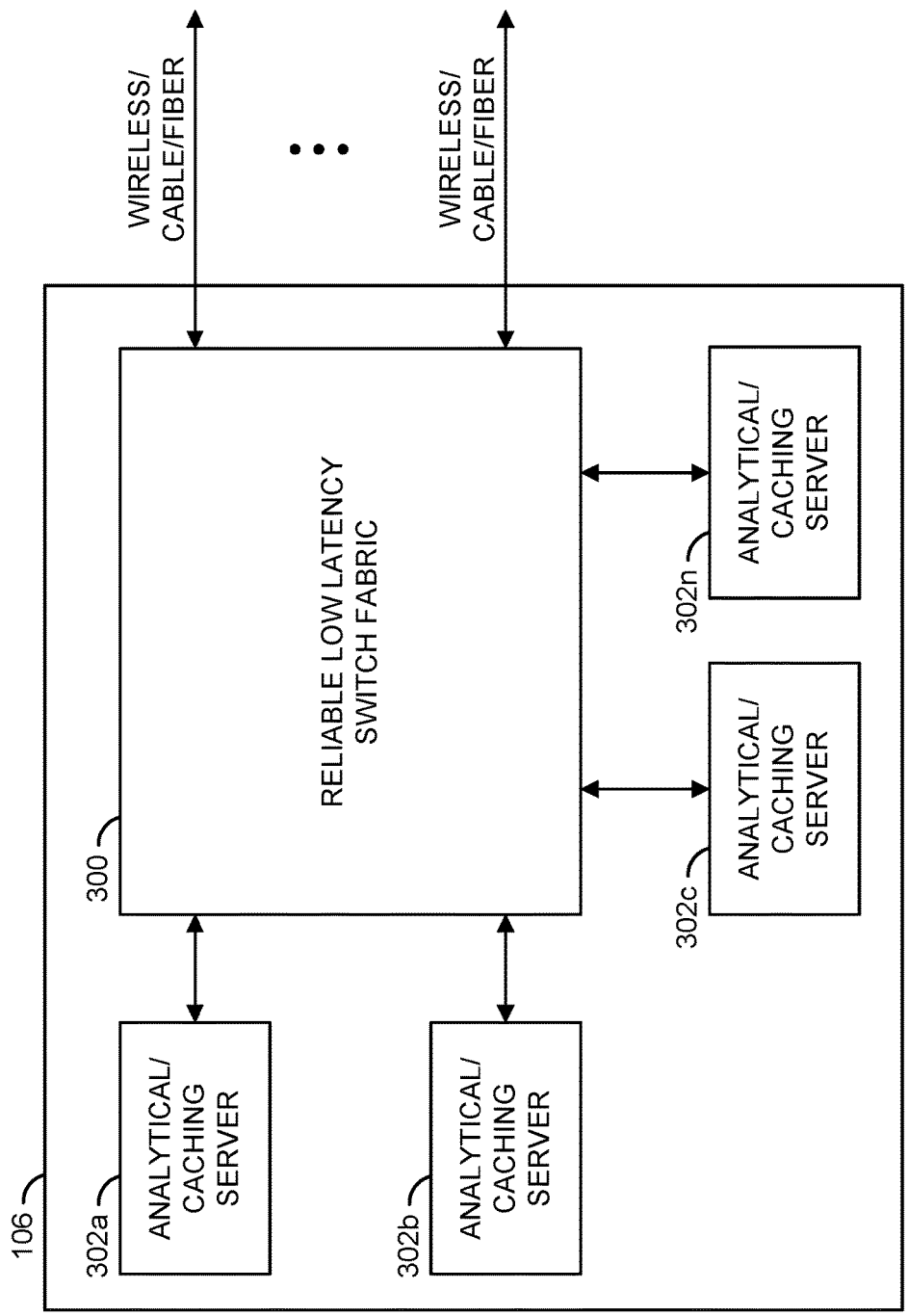
FIG. 3 is a diagram illustrating an example implementation of an edge cloud video headend.

Referring to FIG. 3, a diagram is shown illustrating an example implementation of the edge cloud video headend 106 of FIG. 1. In one example, the edge cloud video headend 106 may include a block 300 and a plurality of blocks 302a-302n. The block 300 generally implements a reliable low latency switch fabric. Each of the blocks 302a-302n may be implemented using an instance of the block 200 of FIG. 2. The low latency switching fabric 300 generally performs aggregation and disaggregation of data across the wireless links and/or the photonics links of the blocks 302a-302n. Distribution of data across the two different types of links may be performed predictively based on link utilization and available bandwidth. In various embodiments, the fabric 300 performs predictive routing of packets using destination ID that is assigned to each node and maps destination ID to individual wavelength in the optical link. Fabric reliability may be achieved either through link level (e.g., layer 1) packet retry/ack/retransmission algorithm or a combination of forward error correction (FEC) and higher layer packet retry/ack/retransmission algorithm. The blocks 302a-302n generally implement analytical/caching servers. The blocks 302a-302n are generally configured to communicate with one another and with external units/devices (e.g., cameras, sensors, data feeds, etc.) through the low latency switch fabric 300.

Figure 4:
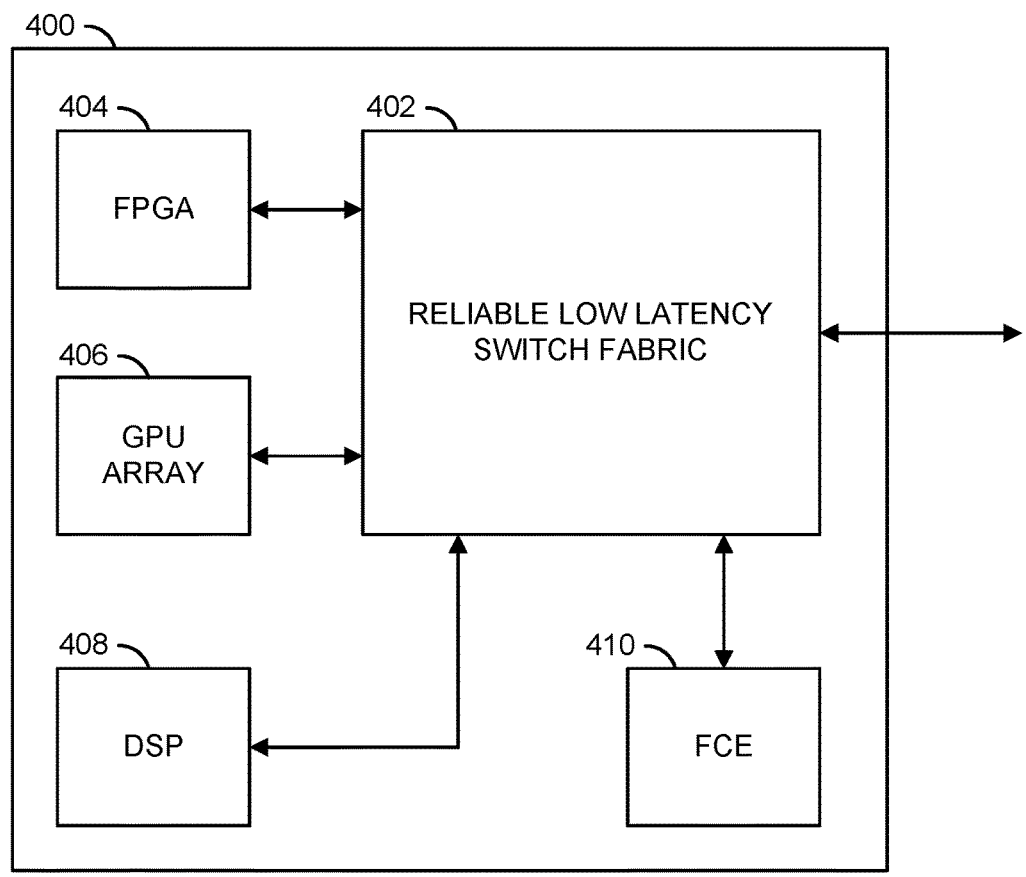
FIG. 4 is a diagram illustrating example components of a flexible computing module.

Referring to FIG. 4, a diagram of a flexible computing module 400 is shown illustrating example components that may be utilized to provide flexible computation in accordance with an example embodiment of the invention. In an example, the flexible computing module (or engine) 400 may include one or more of a block 402, a block 404, a block 406, a block 408, and a block 410. In some embodiments, the block 402 generally implements a reliable low latency switch fabric. The low latency switching fabric 402 may perform predictive routing of packets/signals between each of the blocks 404-410. One or more of the blocks 404-410 may be implemented and configured to provide one or more of predictive analytics and caching, low latency remote memory and storage access acceleration, and predictive traffic shaping. In an example, the block 404 may implement a field-programmable gate array (FPGA) module, the block 406 may implement a graphics processing unit (GPU) module, the block 408 may implement digital signal processing (DSP) module, and the block 410 may implement other types of acceleration and/or flexible computing engines.

In some embodiments, the block 406 may comprise a plurality of GPUs connected by a local low latency switch fabric separate from the block 402. In some embodiments, the GPUs may be connected to the local low latency switch fabric by one or more bridge modules (e.g., a PCIe to RapidIO bridge, a PCIe Gent to RapidIO bridge, etc.). The blocks 404, 408, 410 may also comprise multiple units connected by local low latency switch fabrics and/or bridge modules. The blocks 404-410 may be configured to communicate with one another and with external units through the low latency switch fabric 402. In various embodiments, the blocks 206 and 216 of FIG. 2 may be implemented using the block 400.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions and structures illustrated in the diagrams of FIGS. 1 to 4 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

While the invention has been particularly shown and described with reference to embodiments thereof, it will be understood by those skilled in the art that various changes in form and details may be made without departing from the scope of the invention.

The invention claimed is:

1. A system comprising:
   at least one end-node implementing a first stage of a multi-stage hierarchical analytics and caching technique, wherein said end-node is configured to communicate directly with one or more other end-nodes via one or more wireless links;
   at least one edge node implementing a second stage of the multi-stage hierarchical analytics and caching technique, wherein said edge node is configured to communicate directly with one or more end nodes and one or more other edge nodes via wireless links; and
   an edge cloud video headend implementing a third stage of the multi-stage hierarchical analytics and caching technique and configured to communicate with one or more of said end-nodes and one or more of said edge nodes, wherein said edge cloud video headend is configured to communicate with said one or more edge nodes using cable interconnections, optical interconnections, and wireless interconnections, the at least one end-node, the at least one edge node, and the edge cloud video headend each comprise an analytics and caching module/server that includes a flexible computing engine configured to implement low latency remote memory and storage access acceleration and predictive traffic shaping, and a low latency switching fabric performs predictive routing of packets using a destination ID assigned to each node and maps the destination ID to individual wavelengths of the optical interconnections.

2. The system according to claim 1, wherein the at least one edge node comprises one or more of a camera node and a sensor node.

3. The system according to claim 1, wherein each flexible computing engine is further configured to implement predictive analytics and caching of video and image data based on pre-defined and learned metrics.

4. The system according to claim 3, wherein the learned metrics are based on use.

5. The system according to claim 1, wherein each analytics and caching module/server includes a time and node metadata synchronization engine.

6. The system according to claim 1, wherein each analytics and caching module/server implements a caching and storage function directly attached to said low latency switching fabric.

7. The system according to claim 6, wherein attachment of the caching and storage function to the low latency switching fabric is implemented through both a wireless link and an integrated photonics link.

8. The system according to claim 1, wherein respective analytics and caching module/servers of two or more end-nodes are configured to communicate via a wireless link with each other and with a respective edge node.

9. An apparatus comprising:
   a low latency switch fabric enabled to communicate via one or more wireless links and one or more optical links;
   a first flexible computing engine directly attached to the low latency switch fabric and configured to implement predictive analytics and caching;
   a second flexible computing engine directly attached to the low latency switch fabric and configured to implement low latency remote memory and storage access acceleration and predictive fabric traffic shaping, wherein the low latency switch fabric performs predictive routing of packets using a destination ID assigned to each node and maps the destination ID to individual wavelengths of the optical links;
   a synchronization engine directly attached to the low latency switch fabric and configured to synchronize time and node metadata; and
   a caching and storage module directly attached to the low latency switch fabric by one of said wireless links and one of said optical links.

10. The apparatus according to claim 9, wherein said apparatus implements an analytics and caching server platform.

11. The apparatus according to claim 9, further comprising a video encoding and decoding module directly attached to the low latency switch fabric and configured to receive at least one camera feed.

12. The apparatus according to claim 9, wherein said low latency switch fabric further comprises a wireless link processing module and an integrated photonics link processing module.

13. The apparatus according to claim 12, wherein said integrated photonics link processing module is configured to communicate data using different protocols on different wavelengths.

14. The apparatus according to claim 12, wherein said wireless link processing module and said integrated photonics link processing module are configured to distribute a data transmission across the one or more wireless links and the one or more optical links.

15. The apparatus according to claim 9, wherein at least one of said first flexible computing engine and said second flexible computing engine comprise one or more of a field-programmable gate array, a graphics processing unit, and a digital signal processor.

16. The apparatus according to claim 15, wherein said at least one of said first flexible computing engine and said second flexible computing engine further comprise a local low latency switch fabric.

17. A method of real-time decision making comprising:
implementing a first stage of a multi-stage hierarchical analytics and caching technique in at least one end-node, wherein said end-node is configured to communicate directly with one or more other end-nodes via one or more wireless links;
implementing a second stage of the multi-stage hierarchical analytics and caching technique in an edge node comprising at least one of a camera node and a sensor node, wherein said edge node is configured to communicate with one or more other edge nodes via one or more wireless links and with one or more end-nodes via one or more wireless links; and
implementing a third stage of the multi-stage hierarchical analytics and caching technique in an edge cloud video headend, wherein said edge cloud video headend is configured to communicate with one or more of said end-nodes and one or more of said edge nodes, and said edge cloud video headend is configured to communicate with said one or more edge nodes using cable interconnections, optical interconnections, and wireless interconnections, the at least one end-node, the at least one edge node, and the edge cloud video headend each comprise an analytics and caching module/server that includes a flexible computing engine configured to implement low latency remote memory and storage access acceleration and predictive traffic shaping, and a low latency switching fabric performs predictive routing of packets using a destination ID assigned to each node and maps the destination ID to individual wavelengths of the optical interconnections.

18. The method according to claim 17, wherein respective analytics and caching module/servers of two or more end-nodes are configured to communicate via a wireless link with each other and via a wireless link with a respective edge node.

* * * * *